US007025475B2

(12) United States Patent
Yamazaki et al.

(10) Patent No.: US 7,025,475 B2
(45) Date of Patent: Apr. 11, 2006

(54) ILLUMINATION DEVICE AND PROJECTOR

(75) Inventors: Tetsuro Yamazaki, Fujimi-machi (JP);
Shunji Kamijima, Nagano-Ken (JP);
Daisuke Uchikawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 10/396,584

(22) Filed: Mar. 26, 2003

(65) Prior Publication Data

US 2003/0198050 A1 Oct. 23, 2003

(30) Foreign Application Priority Data

Mar. 26, 2002 (JP) ............................. 2002-087105
Dec. 26, 2002 (JP) ............................. 2002-378055

(51) Int. Cl.
*F21V 7/04* (2006.01)
(52) U.S. Cl. ...................... 362/293; 362/268; 362/551; 362/298
(58) Field of Classification Search ................ 362/298, 362/268, 293, 551, 365, 148
See application file for complete search history.

(56) References Cited

U.S. PATENT DOCUMENTS

| 5,911,489 | A | 6/1999 | Watanabe |
| 6,114,807 | A | 9/2000 | Kavanagh |
| 6,132,049 | A | 10/2000 | Yamaguchi et al. |
| 6,341,876 | B1 | 1/2002 | Moss et al. |
| 6,595,673 | B1 * | 7/2003 | Ferrante et al. ............. 362/551 |
| 6,902,310 | B1 * | 6/2005 | Im ............................ 362/558 |
| 2001/0008470 | A1 | 7/2001 | Dewald ....................... 358/850 |
| 2002/0008791 | A1 | 1/2002 | Okamori et al. |
| 2003/0099108 | A1 * | 5/2003 | Slobodin ..................... 362/293 |

FOREIGN PATENT DOCUMENTS

| CN | A-1307244 | 8/2001 |
| JP | A 03-168628 | 7/1991 |
| JP | A 5-34599 | 2/1993 |
| JP | A 06-088953 | 3/1994 |
| JP | A 7-199182 | 8/1995 |
| JP | A 2000-321529 | 11/2000 |
| JP | A-2001-215613 | 8/2001 |
| WO | WO 98/54611 | 12/1998 |

* cited by examiner

*Primary Examiner*—Sandra O'Shea
*Assistant Examiner*—Anabel Ton
(74) *Attorney, Agent, or Firm*—Oliff & Berridge, PLC

(57) ABSTRACT

An illumination device includes: an integrator that transmits light from an incident side thereof to an emitting side thereof; a light source that supplies the light to the incident side of the integrator, the light source including a reflector and a lamp located on a center axis of the reflector; and a center mirror located on a line connecting the center the incident side of the integrator and the lamp, the center mirror being capable of reflecting light from the integrator back to the integrator. The center mirror has a smaller diameter than that of an opening of the reflector.

21 Claims, 14 Drawing Sheets

RELATIONSHIP BETWEEN CURVATURE
AND CONCAVE OR CONVEX
SHAPE OF OUTER MIRROR

ILLUMINATION DEVICE AND PROJECTOR

BACKGROUND OF THE INVENTION

1. Field of Invention

The present invention relates to illumination devices that use integrators. More specifically, the invention relates to an illumination device of a color-recapture-type.

2. Description of Related Art

In a related art illumination device, such as that disclosed in Japanese Laid-Open Patent Application Publication No. Hei6-88953, a front mirror is disposed at the front of a paraboloid of revolution type reflecting mirror, which converges illumination light from a lamp light source ahead of the light source, and reflects a part of the illumination light from the lamp light source. Also, a center mirror to collimate the light reflected at the front mirror so as to reflect it in the forward direction is provided.

The related art also includes an illumination device which relays only a part of illumination light from a light source, the part being incident on an integrator, to a optical system lying ahead so as to use it as illumination light. For example, in order to display a color image with an image display apparatus having an optical system to modulate light of a single color, such as a so-called single panel projector, the image display apparatus has a color wheel (a color filter) to selectively transmit or absorb white light so as to separate it into luminous flux of three primary colors in a time-division manner by using a rotary color filter, and the integrator to make the intensity distribution of the light uniform; color modulation of the luminous flux of the respective colors is performed by a light valve such as a micro-mirror device; and the modulated luminous flux are projected onto a screen so as to generate a composite color image. In the projector of this system (optical system), since the integrator is disposed behind the color filter, when the color separation of the white light is performed by the filter, a part of the light which does not pass through the filter is reflected thereat and discarded. This is one of the causes of the reduced light utilization efficiency.

The related art also includes a color-recapture-type illumination device having a structure in which the integrator is disposed at the incident side of the color filter, that is, between the light source and the color filter, and the color filter is a color wheel formed of a combination of translucent dichroic films (filters) so as to be provided in a suitable shape, such as a spiral shape, each transmitting light corresponding to its specific color and reflecting light corresponding to the other colors. In this color-recapture-type illumination device, each dichroic film of the corresponding color performs color separation and reflects light which does not pass therethrough towards the integrator. With this structure, although about a fraction of the illumination light from the light source passes through the integrator in one pass and is output to one of the dichroic films corresponding to one of the colors of the color wheel, the light which does not pass through the color filter and is reflected thereat is returned to the integrator without being discarded. Accordingly, the light which does not pass through the color wheel transmits in the integrator and is again made incident on one of the dichroic films of the color filter. On this occasion, when the incident light encounters another one of the dichroic films, the incident light is transmitted through and output from the other dichroic film. As a result, the illumination light from the light source can be used without reducing the light intensity, the light loss decreases, and thus the light utilization efficiency can be enhanced in comparison to the above related art method to perform a color display, thereby achieving a bright color display.

SUMMARY OF THE INVENTION

However, even when the illumination device is of a color-recapture-type, the light utilization efficiency is not 100%. For example, the integrator to transmit light from the incident side to the emitting side thereof does not transmit to the emitting side 100% of the light supplied from the light source to the incident side. Also, although it is expected that the light which does not pass through the dichroic films of the color wheel is returned to the integrator and is then reflected at the integrator so as to emit again towards the color wheel, the integrator does not always effectively output all of the returned light again towards the color wheel. In addition, the illumination light from the light source is not always effectively input into the integrator.

Accordingly, the present invention provides an illumination device which enhances the light utilization of illumination light from a light source. More particularly, the present invention provides a color-recapture-type illumination device which can display a bright, high-quality color image by enhancing the light utilization efficiency.

Even when an integrator transmits light by total reflection or even when its inner surface is reflective, a part of the light emitted from a light source and reaching the incident side of the integrator is not input into the integrator, and instead it is reflected at the integrator. Also, in a color-recapture-type illumination device, a part of the light returned from a color filter to the integrator leaks out from an aperture at the incident side of the integrator to the outside and is thus wasted.

Although, when the incident side is entirely formed as a reflective surface, no light leaks out from the incident side and the returned light can be effectively utilized, but no light is newly incident on the integrator. As a clue to address or solve the above and/or other problems, the inventors of the present invention found the fact that a part of the light is returned from the integrator to the light source in the illumination device using the integrator. However, in the light source having a reflector and a lamp, the output intensity along its center axis is small and the light returned from the integrator is likely to be absorbed by an electrode of the lamp or the like. To address or solve these and/or other problems, according to the present invention, by covering the lamp portion with a center mirror facing towards the incident side of the integrator, the light returned from the integrator to the light source is returned again to the integrator so as to further enhance the light utilization efficiency without reducing the light intensity of illumination light supplied from the light source to the integrator.

According to the present invention, an illumination device includes: an integrator that transmits light from an incident side thereof to an emitting side thereof; a light source that supplies the light to the incident side of the integrator, the light source including a reflector and a lamp located on a center axis of the reflector; and a center mirror located on a line connecting the center the incident side of the integrator and the lamp, the center mirror being capable of reflecting light from the integrator back to the integrator. The center mirror has a smaller diameter than that of an opening of the reflector.

According to one of the aspects of the present invention, the illumination device further includes a color filter located at the emitting side of the integrator, the color filter including a plurality of portions, each of the plurality of the portions transmitting light in respective wavelength ranges and reflecting the light out of the respective wavelength ranges, the respective wavelength ranges of the portions being different from each other, and the at least two portions having the different wavelength ranges from each other correspond to an aperture at the emitting side of the integrator at a time.

According to another aspect of the present invention, the integrator has a reflective inner surface.

According to another aspect of the present invention, the integrator has a multistage structure.

According to another aspect of the present invention, the illumination device further includes an explosion-proof glass plate covering the opening of the reflector, the explosion-proof glass plate having the center mirror.

According to another aspect of the present invention, the center mirror has a flat mirror surface.

According to another aspect of the present invention, the center mirror is a concave mirror.

According to another aspect of the present invention, the center mirror has a focal point in the vicinity of an aperture at the incident side of the integrator.

According to another aspect of the present invention, the center mirror has an outer diameter in the range from 5% to 25% of that of the opening of the reflector.

According to another aspect of the present invention, the center mirror has an outer diameter in the range from 10% to 20% of that of the opening of the reflector.

According to another aspect of the present invention, the center mirror has an outer diameter of about 15% of that of the opening of the reflector.

According to another aspect of the present invention, the illumination device further includes an outer mirror located around an aperture at the incident side of the integrator, the outer mirror being capable of reflecting the light towards the light source.

According to another aspect of the present invention, the outer mirror has a flat mirror surface.

According to another aspect of the present invention, the outer mirror has a truncated cone shape protruding towards the light source.

According to another aspect of the present invention, the outer mirror is a convex mirror.

According to another aspect of the present invention, the outer mirror has a central part and a peripheral part, the central part having a flat mirror surface, and the peripheral part having a convex surface or a truncated cone shape protruding towards the light source.

According to another aspect of the present invention, the outer mirror has a truncated cone shape protruding towards the emitting side.

According to another aspect of the present invention, the outer mirror is a concave mirror.

According to another aspect of the present invention, the outer mirror has a central part and a peripheral part, the central part having a flat mirror surface, and the peripheral part having a concave surface or a truncated cone shape protruding towards the emitting side.

According to another aspect of the present invention, the center mirror is a concave mirror, and the outer mirror is a convex mirror having a larger radius of curvature than that of the center mirror.

According to one of the aspects of the present invention, a projector includes: the illumination device; a light valve that modulates the light of respective colors output from the illumination device; and a lens system that projects light modulated by the light valve.

More particularly, an illumination device according to the present invention includes an integrator to transmit light from an incident side thereof to an emitting side thereof, and a light source, including a reflector and a lamp located on the center axis thereof, to supply light to an aperture at the incident side of the integrator; and a center mirror, located on the line connecting the center an aperture at the incident side of the integrator and the center of the lamp, to reflect light from the integrator back to the integrator. The center mirror has a smaller diameter than that of an opening of the reflector. The illumination device according to the present invention is effective to all illumination devices having integrators, since a part of the light supplied from the light source to the integrator and is not input into the integrator can be reused. In addition, when the illumination device is of a color-recapture-type, it is more effective since the light which is returned from a color filter to the integrator and then leaks out from the incident side of the integrator can be reused by the center mirror. That is, an illumination device according to the present invention is effective to a color-recapture-type illumination device including a color filter located at the emitting side of the integrator, the color filter including a plurality of portions, each of the plurality of the portion transmitting light in a respective wavelength range and reflecting the light out of the respective wavelength range, the respective wavelength ranges of the portions being different from each other, and the at least two portions having the different wavelength ranges from each other correspond to an aperture at the emitting side of the integrator at a time color-recapture-type.

In a lamp light source, such as a halogen lamp or a xenon lamp, incident light is supplied from its lamp located at its center to the integrator via the reflector surrounding the lamp. Since an electrode is disposed at the center of the lamp, little of the light intensity is directly output from the lamp to the integrator. Therefore, most of the light input into the integrator is reflected by the reflector so that an intensity distribution having a peak value at a certain angle (for example, an angle θ) with respect to the optical axis connecting the center of the lamp and the center of the integrator is provided. On the other hand, as described above, the light leaking out from the aperture at the incident side of the integrator reaches the lamp located on the optical axis and at the center of the light source, and is then wasted since the reached light is absorbed or scattered by the electrode of the lamp or the like. Hence, the center mirror having a smaller diameter than that of the opening of the reflector is located on the optical axis and between the incident aperture of the integrator and the lamp of the light source so as to face a reflection side towards the integrator. With this arrangement, the center mirror does not block a major part (a component distributed in the vicinity of the angle θ) of the light intensity of the incident light from the light source and also reflects the light leaking out from the aperture at the incident side of the integrator back to the integrator.

Thus, with the illumination device according to the present invention, the light reflected at the color wheel and returned to the integrator is subjected to effective multiple-reflection in the integrator including the center mirror, and is again output towards the color wheel. Accordingly, this structure of the illumination device according to the present invention is suitable for a color-recapture-type one, whereby an illumination device having high utilization efficiency and being suitable to display a bright, high-quality color image can be provided. As a result, by disposing the illumination device according to the present invention; a light valve to form an image based on luminous flux of respective colors output from this illumination device; and a lens system to project the light from the light valve, a projector to display a bright, high-quality color image which is free from inconsistencies in brightness can be provided. A transmission type liquid crystal device or the like may be used as the light valve. However, a reflective switching device which absorbs little of the light and can be driven at high speed, such as a micro-mirror device or a device utilizing an evanescent wave, is more suitable.

The integrator available in the present invention is not limited to that having a straight, rectangular parallelepiped shape, and instead it may have a multistage structure having at least two stages with a reflective end surface between the incident side and the emitting sides of the integrator. With the integrator having a multistage structure, since the light reflected at the color wheel is reflected at the reflective end surface disposed close the emitting side, that is, close to the color wheel, the number of reflection in the integrator can be reduced and thus the light utilization efficiency can be enhanced.

Although the center mirror according to the present invention can be independently disposed at an appropriate location between the light source and the integrator, the center mirror may be integrally formed with an explosion-proof glass plate to cover the opening of the reflector, so that the center mirror can be integrated with the light source side. This structure has additional advantages in cost, man-hours to assemble the illumination device, and its accuracy since there is no need to prepare the center mirror as an independent component.

The center mirror may have a flat mirror surface (a flat mirror) so as to offer a cost advantage. When the center mirror is a concave mirror, in other words, when it has a curved mirror surface protruding towards the light source, the light leaking out from the aperture at the incident side of the integrator can be returned to the aperture at the incident side without diffusion. To address or achieve this, it is preferable that the concave center mirror have a focal point in the vicinity of the aperture at the incident side of the integrator.

In the illumination device according to the present invention, the larger the area of the center mirror, the more of the light leaking out from the integrator can be reflected at the center mirror, and thus the utilization efficiency of the leaked light can be enhanced. On the other hand, since this enlargement causes a decrease in the area of the light path of the incident light supplied from the light source and the reflector, the quantity of the incident light is likely to decrease. On the basis of the experimental results conducted by the inventors of this inventions, when the outer diameter of the center mirror is not greater than 25% of that of the reflector, the quantity of illumination light emitted from the light source and introduced into the integrator is at least half the quantity of light obtained without the center mirror. Hence, in consideration of the requirement that the diameter of the center mirror be at least about 5% of that of the reflector so as to function as a center mirror, it is preferable that the outer diameter of the center mirror be in the range from 5% to 25% of that of the opening of the reflector. Also, when the outer diameter of the center mirror is not greater than 20% of that of the reflector, at least about three quarters of the quantity of light obtained without the center mirror can be maintained. In addition, when the outer diameter of the center mirror is about 10% of that of the reflector, the quantity of light substantially the same as that obtained without the center mirror can be maintained. Therefore, it is more preferable that the outer diameter of the center mirror be in the range from 10% to 20%. Furthermore, when the outer diameter of the center mirror is about 15% of that of the reflector, the quantity of the light decreases by several percent, while the quantity of the light, which leaks out from the integrator, reflected at the center mirror increases. Accordingly, it is even more preferable that the outer diameter of the center mirror be about 15% of that of the opening of the reflector. In the meantime, since the reflector and the center mirror are not always round, when they are polygons, each outer diameter can be determined by the corresponding mean outer diameter or the outer diameter of the corresponding a circumscribed circle.

Regardless of the presence or absence of the center mirror, not all the light output from the light source is input into the integrator. That is, a part of the light is not introduced into the aperture at the incident side of the integrator and is therefore wasted. This is due to the fact that, since the lamp of the light source is not an ideal point light source and also it is difficult for the reflector to converge light at the aperture at the incident side of the integrator, it is inevitable for the light to diverge to a certain extent. More particularly, about 20% to 30% of the light is not incident on the integrator. Hence, it is preferable that, in addition to the center mirror, an outer mirror for reflecting light towards the light source be disposed around the aperture at the incident side of the integrator so that the outer mirror reflects the incident light around the aperture back to the light source so as to be supplied again to the aperture of the integrator. On this occasion, since the center mirror is provided, the light reflected at the outer mirror is prevented from being absorbed or scattered by the lamp, the electrode, or the like of the light source.

When the outer mirror is a flat mirror, it has the advantages that it easy to make and the utilization efficiency can be enhanced at low cost. When the outer mirror has a truncated cone shape protruding towards the light source and having an outer surface formed as a mirror or when the outer mirror has a convex mirror, that is, a surface protruding towards the light source, the light reflected at the outer mirror towards the light source is directed towards the reflector and the center mirror, thereby preventing the lamp from absorbing the reflected light. It is also possible that the outer mirror has a flat mirror surface at the central part thereof and a convex surface or a truncated cone shape protruding towards the light source at the peripheral part thereof.

Also, it is possible that the outer mirror have a truncated cone shape protruding towards the emitting side of the integrator and having an inner surface formed as a mirror, or that it is a concave mirror, in other words, it has a convex surface protruding towards the emitting side of the integrator. Even when the outer mirror has such a structure, since the light reflected towards the light source is directed towards the reflector and the center mirror, the reflected light is prevented from being absorbed by the lamp and is effectively reflected by the reflector and the center mirror so as to be guided to the aperture at the incident side of the integrator. Also, the outer mirror may be formed such that its central part has a flat mirror surface and its peripheral part has a convex surface or a truncated cone shape protruding towards the emitting side of the integrator.

The light utilization efficiency is enhanced by an optical system arranged such that the incident light reflected by and supplied from the reflector is reflected by the outer mirror so as to be guided to the center mirror located on the optical axis and eventually to the aperture at the incident side of the integrator. To address or achieve this, it is preferable that the outer mirror be a convex mirror having a larger radius of curvature than that of the center mirror, that is, a smaller curvature than that of the center mirror.

BRIEF DESCRIPTION OF THE DRAWINGS

FIG. 9(a) is a perspective view and FIG. 9(b) is a plan view;

FIG. 10(a) is a perspective view and FIG. 10(b) is a plan view;

FIG. 11(a) is a perspective view and FIG. 11(b) is a plan view;

DETAILED DESCRIPTION OF PREFERRED EMBODIMENTS

Figure 1:
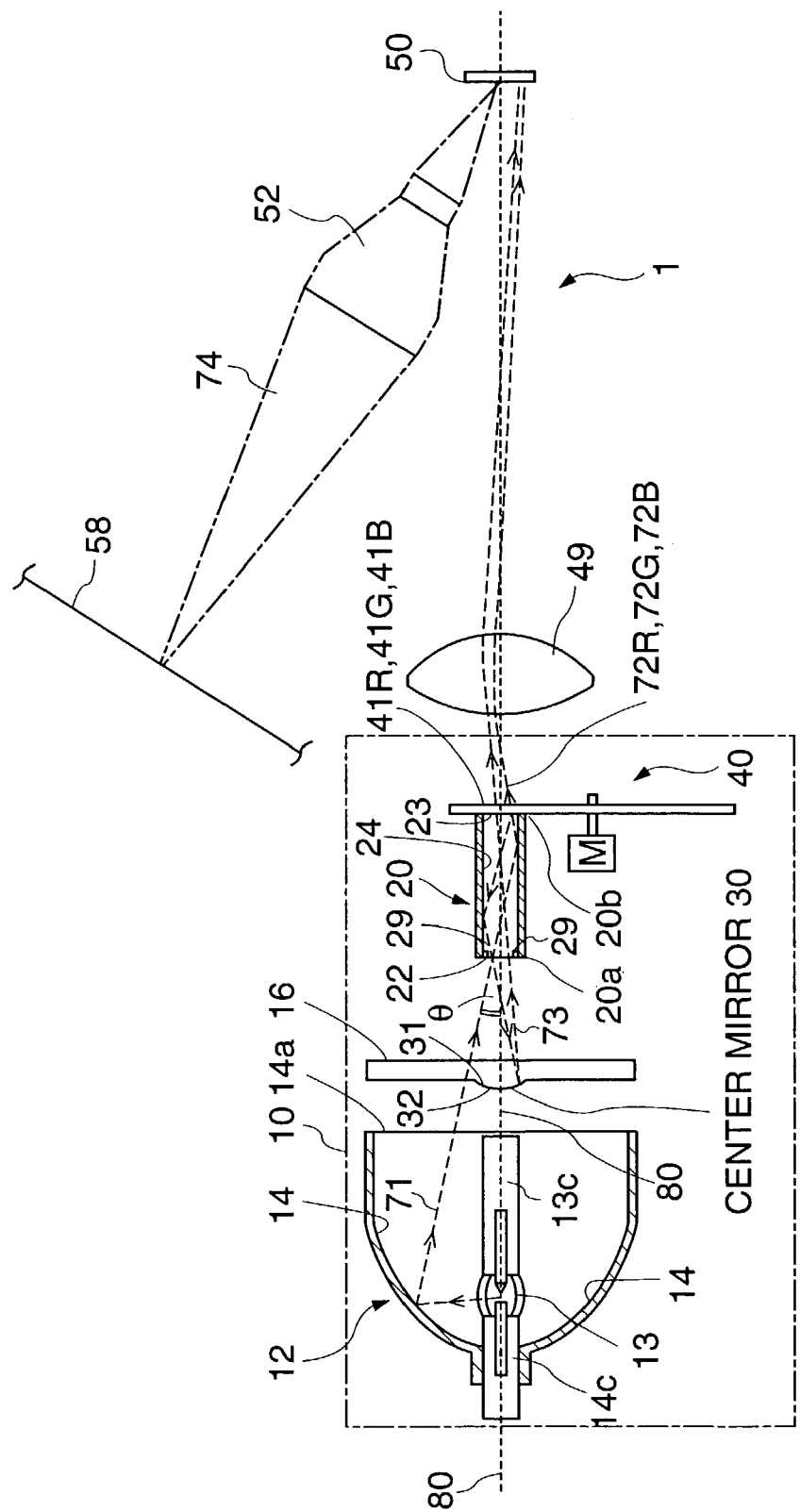
FIG. 1 is a schematic of a projector using a color-recapture-type illumination device according to the present invention.
Figure 2:
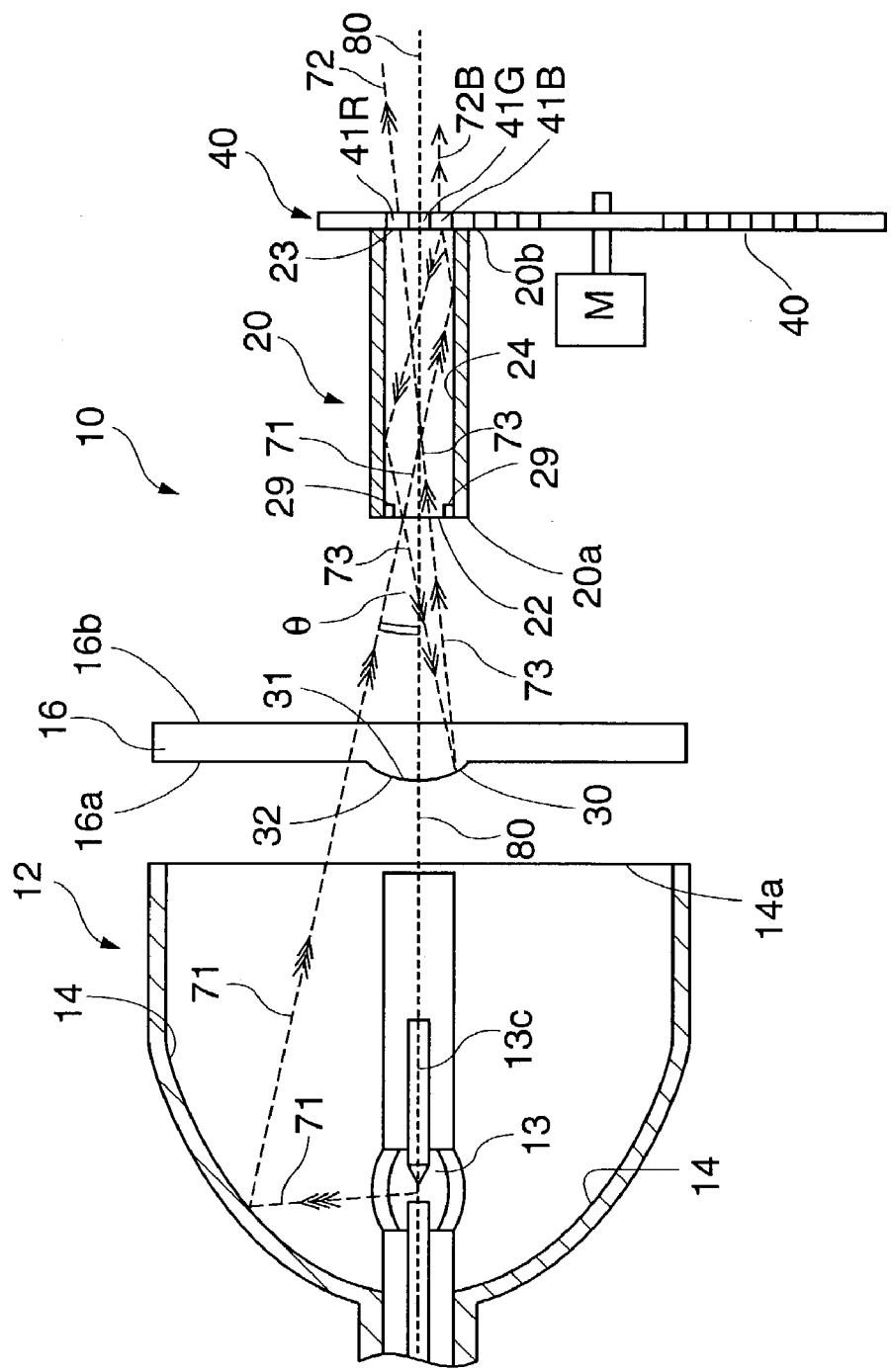
FIG. 2 is an enlarged schematic of the illumination device shown in FIG. 1.

Exemplary embodiments of the present invention are described below with reference to the accompanying drawings. FIG. 1 is a schematic that illustrates a projector 1 having an illumination device 10 according to the present invention. Also, FIG. 2 is an enlarged schematic of the illumination device 10. The projector 1 includes the illumination device 10, a relay lens 49 that transmits luminous flux 72R, 72G, and 72B separated into the respective colors and output by the illumination device 10, a micro-mirror device (light valve) 50 that modulates the luminous flux 72R, 72G, 72B emitted from this lens 49 in response to image data, and a projection lens 52 that projects display light 74 output from the mirror device 50 onto a screen 58 so as to form a color image on the screen 58.

The illumination device 10 includes a light source 12, a prismatic integrator 20 having a hollow shape with a reflective inner surface 24, and a color wheel (color filter) 40 that separates a white luminous flux 71 in a time-division manner, located in that order from the light source 12 in the light emitting direction. Thus, the integrator 20 is positioned between the light source 12 and the color wheel 40. The light source 12 has a reflector 14 and an arc lamp 13, such as a xenon lamp, placed on a center axis 14c of the reflector so as to output the white luminous flux 71. Also, the reflector 14 has an opening 14a covered with an explosion-proof glass plate 16.

The integrator 20 is the prismatic rod having the hollow shape with the inner surface 24, serving as a reflective inner surface, and a square or rectangular cross-section. The integrator 20 has a round aperture 22 at an incident side 20a thereof, a reflective end surface 29 located around the aperture 22, and a square or rectangular aperture 23 located at an emitting side 20b thereof so as to face the color wheel 40. The color wheel 40 has dichroic films (filters) 41R, 41G, and 41B which are provided in a suitable shape such as a spiral shape, each of the films transmitting light corresponding to its specific color and reflecting light corresponding to the other colors. Moreover, at least two dichroic films, in the present exemplary embodiment three dichroic films 41R, 41G and 41B, correspond to the aperture 23 at the emitting side of the integrator at a time. This means that the at least two dichroic films are always positioned in an optical path from the aperture 23 even if the color wheel 40 is being rotated. With this structure, the dichroic films 41R, 41G, and 41B of the respective colors performs color separation, and also, light 73 which does not pass therethrough is reflected back towards the integrator 20.

Accordingly, the light 73 which does not pass through one of the dichroic films 41R, 41G, and 41B is returned to the integrator 20 without being discarded and is again output to the color wheel 40 after being reflected by the reflective end surface 29 and the inner surface 24 in the integrator 20. On this occasion, when the light 73 encounters another one of the dichroic films 41R, 41G, and 41B, the light 73 is transmitted through and output from the other dichroic film. In the illumination device 10 in this example, the white luminous flux 71 emitted from the light source 12 has an intensity distribution that is made uniform by the integrator 20 in accordance with the shape of a light valve, and is also output from the color wheel 40 after being subjected to temporal and spatial color separation. In addition, the light which does not pass through the color wheel 40 is reused in the integrator 20. Accordingly, the illumination device 10 in this example is of a color-recapture-type.

With this arrangement, the luminous flux 72R, 72G, 72B of the respective colors passing through the corresponding dichroic films 41R, 41G, and 41B, which move up or down in accordance with the rotation of the color wheel 40, are emitted from the illumination device 10, ideally after being subjected to temporal and spatial color separation without loss in the color wheel 40. Accordingly, by controlling the light valve 50 in synchronization with timing of the shifting luminous flux 72R, 72G, 72B in accordance with the rotation of the color wheel 40, a bright multi-color image can be projected onto the screen 58.

As shown in FIG. 2, in the illumination device 10 in this example, the explosion-proof glass plate 16 has a center mirror 30, to reflect light back towards the integrator 20, formed at the center thereof, located on a line (an optical axis) 80 connecting the center the aperture 22 at the incident side 20a of the integrator 20 and the center of the lamp 13. The center mirror 30 in this example has a mirror surface having a smaller diameter than that of the opening 14a of the reflector 14. The center mirror 30 has a concave shape with respect to the integrator 20. The center mirror 30 is obtained as follows: The central part of a surface 16a of the explosion-proof glass plate 16 which is transparent 12 is formed so as to be a concave portion; then, reflective material is disposed on the convex central part so as to form a concave reflective surface 31 on the explosion-proof glass plate 16; then, the explosion-proof glass plate 16 is located between the light source 12 and the integrator 20 so that its concave reflective surface 31 is oriented toward the integrator 20; finally, the concave reflective surface 31 is the center mirror 30. The concave mirror 31 is optically arranged so as to have a focal point in the vicinity of the aperture 22 at the incident side of the integrator 20.

In this illumination device 10, the light 71 output from the xenon lamp 13 is reflected at the reflector 14 and output towards the integrator 20 so as to be guided to the aperture 22 at the incident side of the integrator 20 and thus to become the incident light 71. Because of structural matters of the xenon lamp 13, such as its electrode positioned on a tube axis 13c thereof, little of the light transmitting through the optical axis 80 is directly supplied to the integrator 20; instead, most of the incident light 71 is output via the reflector 14 surrounding the lamp 13. Thus, the intensity distribution depending on the angle of incidence with respect to the optical axis 80 shows that the light 71 having the angle of incidence θ (not zero) mainly contributes to the intensity at the aperture 22 of the integrator 20.

When the light 71 incident on the integrator 20 is guided to the color wheel 40, a part of the light 71 passing through the color wheel 40 becomes output light 72, and the other part thereof reflected at the color wheel 40 is returned to the integrator 20. Although most of the returned light is reflected towards the color wheel 40 at the inner surface 24 and/or a reflective end surface 29 disposed around the aperture 22 at the incident side, a part of the returned light leaks out from the aperture 22 at the incident side of the integrator 20. In the illumination device 10 in this example, the leaked light 73 is reflected at the center mirror 30 and become again incident on the integrator 20. Then, the re-incident light 73 is subjected to multiple reflection in the integrator 20, is directed towards the aperture 23 at the emitting side 20b, and is selectively output by one of the dichroic films 41R, 41G, and 41B of the color wheel 40.

Without the center mirror 30, the leaked light 73 out from the aperture 22 at the incident side of the integrator 20 would be output towards the light source 12. In such a case, if the leaked light 73 is reflected at the reflector 14, it is likely to be returned to the integrator 20. However, since the lamp 13 is disposed on the extended line of the aperture 22, that is, on the optical axis 80, the leaked light 73 is absorbed or scattered by the electrode or the like of the lamp 13 upon reaching the lamp 13, thereby reducing the possibility of it returning to the integrator 20. Meanwhile, in the illumination device 10 in this example, since the center mirror 30 is positioned on the optical axis 80 and between the integrator 20 and the lamp 13, the leaked light 73 out from the aperture 22 at the incident side is returned to the incident side of the integrator 20 without being absorbed or scattered by the lamp 13 or the like. Accordingly, the light returned to the integrator 20 from the color wheel 40 is more effectively reused by passing through the integrator 20, thereby allowing the color-recapture-type illumination device to further improve the light utilization efficiency. As a result, the illumination device 10 in this example can further increase the light intensity of illumination light output from the integrator 20 of the illumination device 10, whereby the projector 1 displaying a bright, high-quality color image can be provided.

Figure 3:
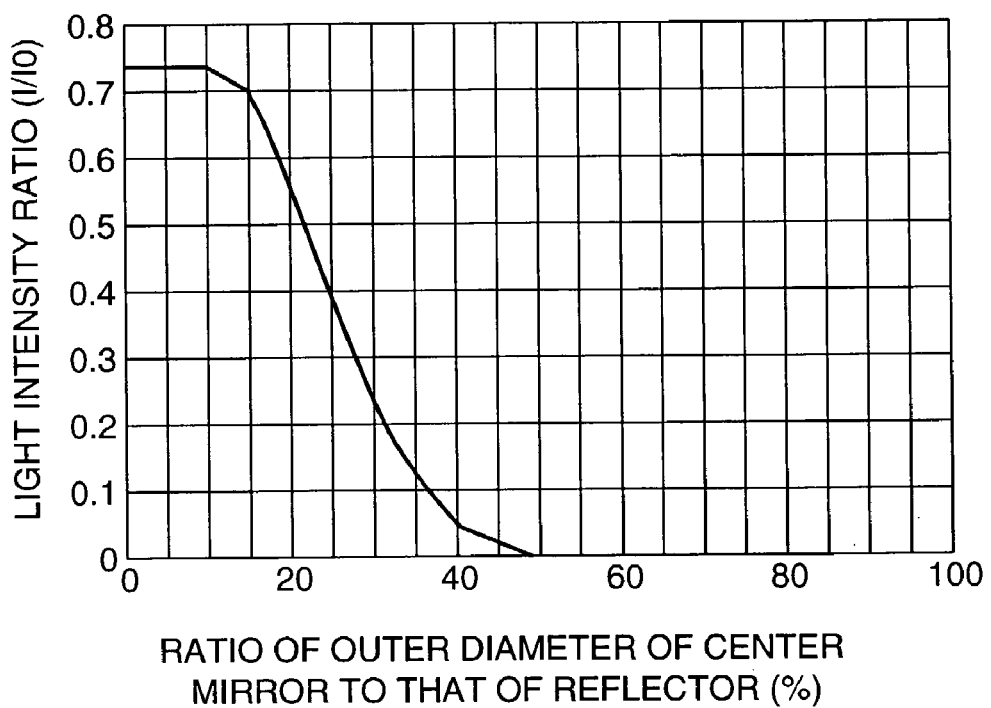
FIG. 3 is a graph illustrating the relationship between the outer diameter of an opening of a reflector of a light source and that of a center mirror.
Figure 4:
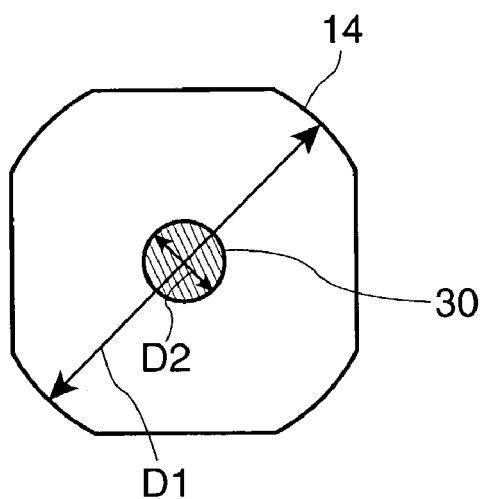
FIG. 4 is a schematic that illustrates the outer diameters of the opening of the reflector and the center mirror shown in FIG. 3.

From the viewpoint of enhancing the light utilization efficiency by effectively reflecting the leaked light 73 out from the aperture 22 at the incident side of the integrator 20, it is preferable that the center mirror 30 has a large area. However, since the center mirror 30 is located between the light source 12 and the aperture 22 of the integrator 20, as the center mirror 30 becomes large, the cross-sectional area of the optical path of the incident light 71 supplied from the reflector 14 of the light source 12 becomes small. In this respect, it is preferable that the center mirror 30 has a small area. FIG. 3 shows the relationship between the outer diameter D2 of the center mirror 30 and the light intensity I, and illustrates how the light intensity I of the incident light 71 incident on the integrator 20 from the light source 12 varies with respect to the diameter of the center mirror 30, where the light intensity I is shown by the ratio (light intensity ratio (I/I0)) with respect to the output intensity I0 of the lamp 13 and, as shown in FIG. 4, the outer diameter D2 of the center mirror 30 is also shown as a percentage (%) with respect to the diameter (outer diameter) D1 of the opening 14a of the reflector 14.

As is seen from FIG. 3, as long as the outer diameter D2 of the center mirror 30 is not greater than 25% of the outer diameter D1 of the opening 14a of the reflector 14, the light intensity ratio is at least about 0.4, where the intensity ratio of light incident on the integrator 20 from the light source 12 is at least half the light intensity ratio of about 0.74 obtained without the center mirror 30. Meanwhile, the necessary outer diameter D2 of the center mirror 30 is at least about 5% of the outer diameter D1 of the opening 14a of the reflector 14, and such a size does not affect the light intensity of incident light on the integrator 20, as is seen in FIG. 3. Accordingly, the outer diameter D2 of the center mirror 30 is preferably in the range from 5% to 25% of the outer diameter D1 of the opening 14a of the reflector 14.

When the outer diameter D2 of the center mirror 30 is not greater than 20% of the outer diameter D1 of the opening 14a of the reflector 14, the light intensity ratio is at least about 0.55, whereby at least about three quarters of the light intensity obtained without the center mirror 30 can be maintained. Accordingly, since the light intensity of the incident light 71 serving as a source increases, the light utilization efficiency is likely to exceed the above-mentioned efficiency.

Also, when the outer diameter D2 of the center mirror 30 is about 10% of the outer diameter D1 of the opening 14a of the reflector 14, a light intensity ratio which is substantially the same as that obtained without the center mirror 30 can be maintained. Even when the outer diameter D2 of the center mirror 30 increases to the above-mentioned size in order to increase the area thereof, the light intensity of incident light does not decrease. Therefore, only an advantage that the leaked light 73 is collected by the center mirror 30 can be enjoyed. Therefore, the outer diameter D2 of the center mirror 30 is preferably in the range from 10% to 20% of the outer diameter D1 of the opening 14a of the reflector 14.

Furthermore, when the outer diameter D2 of the center mirror 30 is about 15% of the outer diameter D1 of the opening 14a of the reflector 14, the light intensity ratio is reduced by several percent, on the other hand, the light intensity of the light leaking out from the integrator 20 and reflected by the center mirror 30 increases. Since this arrangement provides a better advantage that the reduction of the light intensity of the incident light 71 caused by the center mirror 30 is reduced or minimized and also the leaked light 73 is collected by the center mirror 30, it is believed that, with this arrangement, the total-light utilization efficiency of the illumination device 10 is high. Thus, the outer diameter D2 of the center mirror 30 is more preferably about 15% of the outer diameter D1 of the opening 14a of the reflector 14.

Although the opening 14a of the reflector 14 does not always have a round shape, as shown in FIG. 4, the foregoing outer diameter D1 of the opening 14a having a polygonal shape can be determined by its mean outer diameter or the outer diameter of its circumscribed circle. The same applies to the center mirror 30. Also, when the rear surface, that is, a surface 32 of the center mirror 30 facing the lamp 13 is formed so as to serve as a mirror surface to reflect light towards the reflector 14, the amount of the light absorbed by the lamp 13 can be decreased, and, in this case, the outer diameter D2 of the center mirror 30 can be further enlarged.

Although the center mirror 30 is integrally formed with the explosion-proof glass plate 16 in the above-described example, it is not limited to this example, and it may be positioned as an independent or separate optical element on the center line 80 (optical axis) and between the light source 12 and the integrator 20. However, since this structure leads to an increase in the number of components and thus results in increases in cost and man-hours for assembly, it is desirable that the center mirror 30 is integrally formed with the surface 16a of the explosion-proof glass plate 16 facing the lamp, as in this example, or with a surface 16b of the same facing the integrator 20.

Although the center mirror 30 in this example has a concave mirror surface and this shape is desirable to reliably condense the leaked light 73 out from the integrator 20 at the aperture 22 of the integrator 20, the center mirror may be formed so as to have a flat mirror surface, which is easier to make, from the viewpoint of cost. Since, even with the flat mirror, the leaked light 73 is returned to the integrator 20 without reaching the lamp 13, the light utilization efficiency of the illumination device 10 can be enhanced.

Since the electrode of the lamp blocks the light path of the light reflected at the reflector 14, most of the reflected light does not pass through the top of the electrode, close to the integrator, thereby resulting in a shadow at the top of the electrode. Accordingly, when the center mirror 30 is disposed in this shadow spot, the light reflected at the reflector 14 is not blocked by the center mirror 30. The center mirror 30 may be disposed, as is described below, such that an independently prepared mirror is fixed to the top of the lamp with a heat-resistant adhesive.

Figure 5:
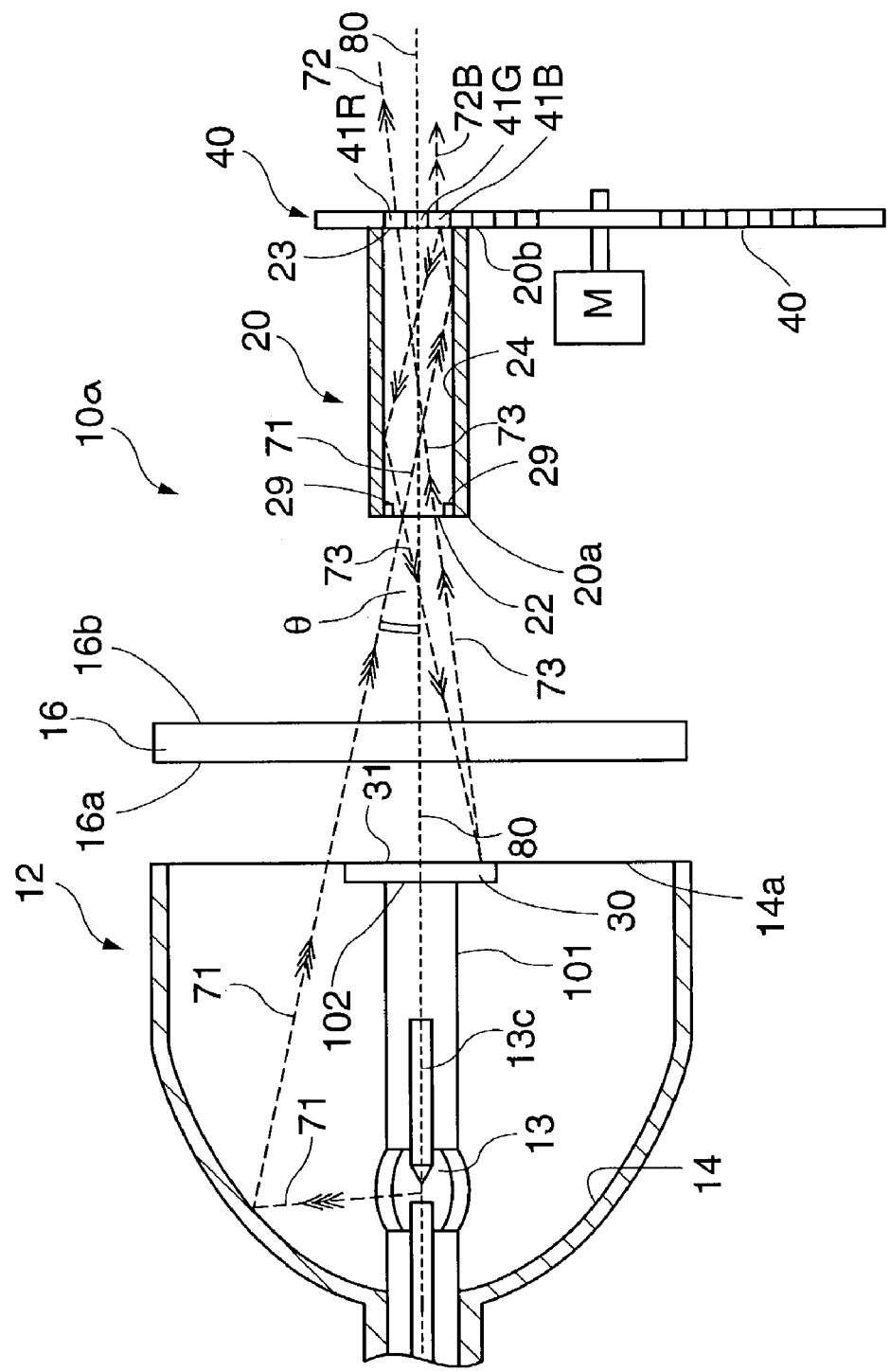
FIG. 5 is a schematic of another illumination device.

FIG. 5 illustrates another illumination device 10a. As described above, in order to effectively reflect the light reaching directly or indirectly from the integrator 20 back to the integrator 20, it is preferable that the center mirror 30 has a large diameter. In order to enlarge the diameter of the center mirror 30 while preventing the center mirror 30 from blocking the light directed from the lamp 13 (and its reflector 14) to the integrator 20, it is desirable that the center mirror 30 be positioned as close as possible to the lamp 13. Thus, in the illumination device 10a in this example, the center mirror 30 is fixed at a top 102 of a cathode sealing tube 101 protruding forwards along the center axis of the lamp 13. Although this location is most suitable for the center mirror 30 to be fixed close to the lamp 13, there are some subjects of discussion that the temperature at this location becomes high, an electrode wire protrudes therefrom, and, in addition, it is difficult to control the fixing angle of the center mirror 30 since the top 102 of the cathode sealing tube 101 is not guaranteed to be flat, and so forth.

Figure 6:
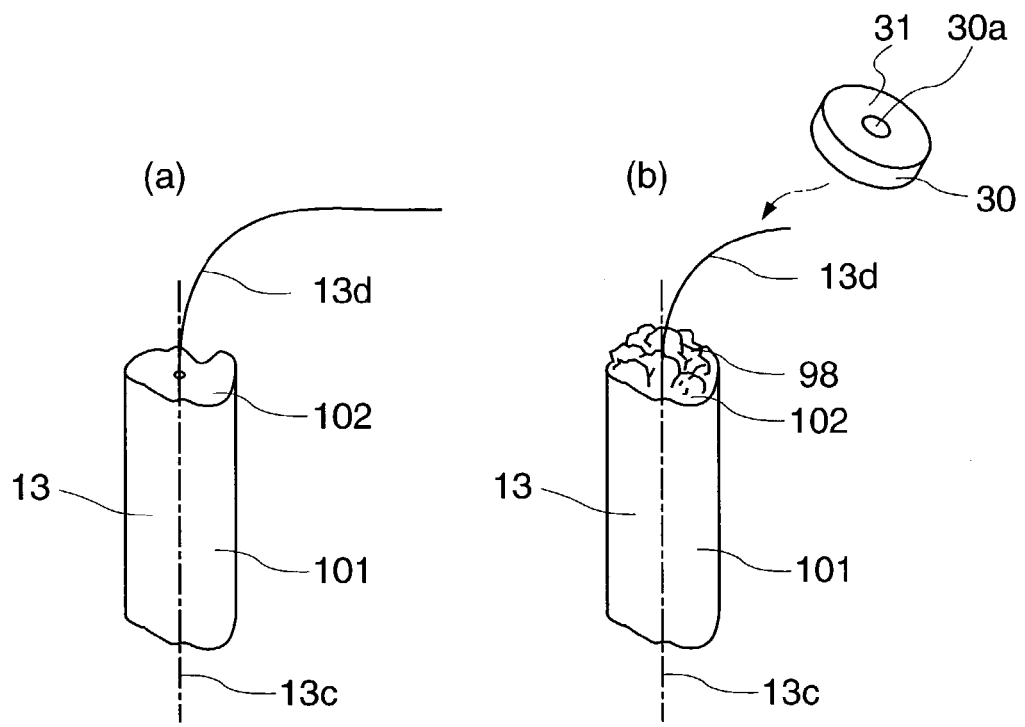
FIGS. 6(a) and 6(b) are schematic perspective views showing a method of fixing a center mirror of the illumination device shown in FIG. 5.

FIGS. 6(a) and 6(b) illustrate an example of fixing the center mirror 30 at the top 102 of the cathode sealing tube 101 of the lamp 13. In this fixing method, a heat-resistant adhesive 98 is applied to the top 102 of the lamp tube 13 in a heaping-up manner. The center mirror 30 is formed so as to allow an electrode wire 13d extending from the top 102 of the lamp 13 to pass through the center mirror 30. In this example, the center mirror 30 has a through-hole 30a, having a diameter of about 1 mm, formed in advance at the center thereof. Since the electrode wire 13d of the lamp 13 has a diameter of about 0.6 mm, the hole 30a to allow the electrode wire 13d to pass therethrough is provided without substantially reducing the area of the reflective surface 31.

The center mirror 30 is bonded to the top 102 of the lamp 13, having the adhesive 98 attached thereto, such that the tube axis 13c of the lamp 13 is coaxially fixed with the center (the through-hole 30a, or the axis of the reflective surface) of the center mirror 30. For example, the heat-resistant adhesive is SUMICERAM (brand name, made by Asahi Chemical Co., Ltd.) or ARON CERAMIC (brand name, made by Toagosei, Co., Ltd.).

Figure 7:
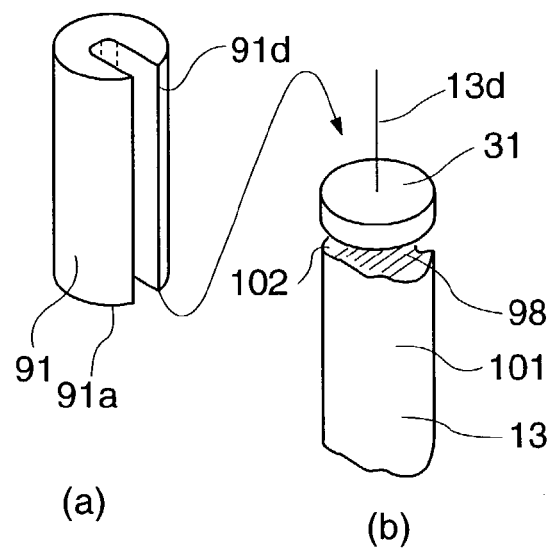
FIGS. 7(a) and 7(b) are schematic perspective views showing a method of adjusting the angle of the center mirror of the illumination device shown in FIG. 5.

The top 102 of the lamp is not always flat, as described above. Thus, since the center mirror 30 is bonded as the adhesive 98 is heaped up, the angle of the center mirror 30 can be adjusted. However it is very difficult to fix the reflective surface 31 so that the optical axis 80 is perpendicular to (at least the center of) the reflective surface 31. To address or solve this problem, as shown in FIGS. 7(a) and 7(b), by using a cylindrical or column-shaped jig 91 having a cut 91d at the center thereof so as to allow the electrode wire 13d to pass therethrough, the surface of the center mirror 30 can be adjusted so as to be perpendicular to the optical axis 80. More particularly, although the flatness of the top 102 of the cathode sealing tube 101 is not guaranteed, since the cathode sealing tube 101 extends substantially along the optical axis 80, when the column-shaped jig 91 is disposed on the center mirror 30 which has been disposed on the top 102 of the cathode sealing tube 101 such that its outer surface is aligned in connection with the outer surface of the cathode sealing tube 101, and when the column-shaped jig 91 has an end surface 91a formed so as to be perpendicular to the column, the center mirror 30 can be fixed by using the end surface 91a as a reference surface.

Figure 8:
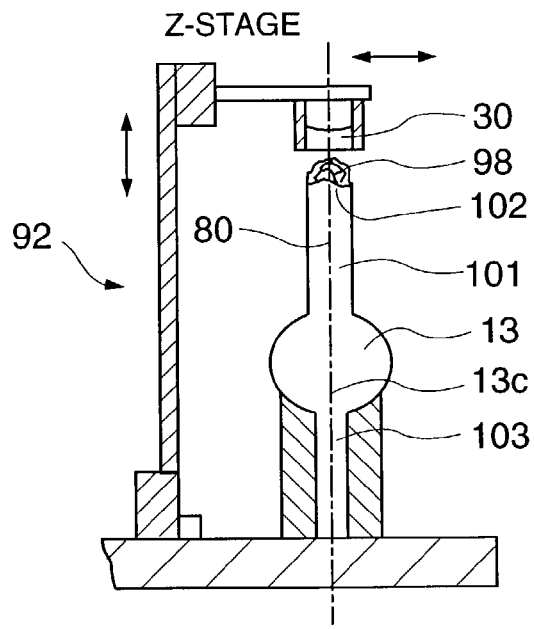
FIG. 8 is a schematic that illustrates another method of adjusting the angle of the center mirror of the illumination device shown in FIG. 5.
Figure 9:
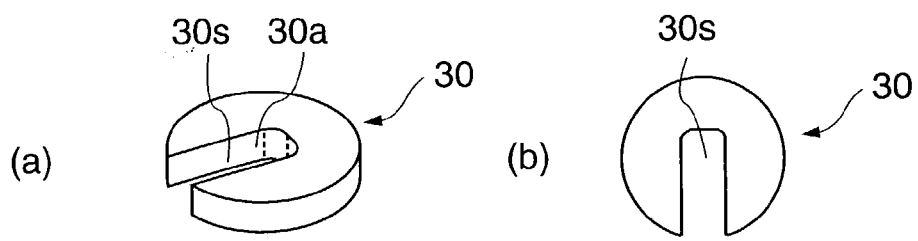
FIGS. 9(a) and 9(b) are schematics that illustrate a center mirror suitable for use in the illumination device shown in FIG. 5, where
Figure 10:
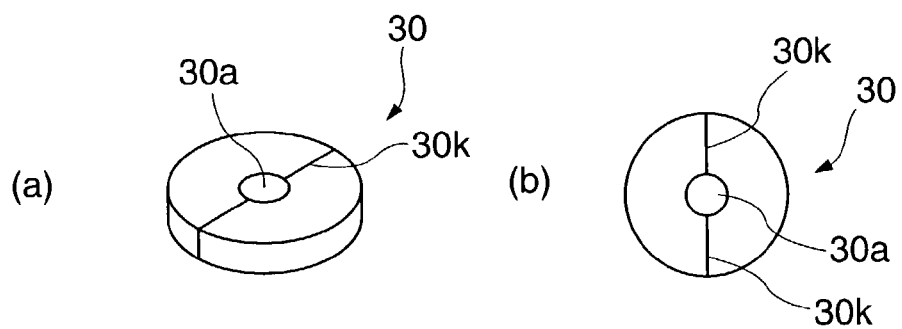
FIGS. 10(a) and 10(b) are schematics that illustrate another center mirror suitable for use in the illumination device shown in FIG. 5, where
Figure 11:
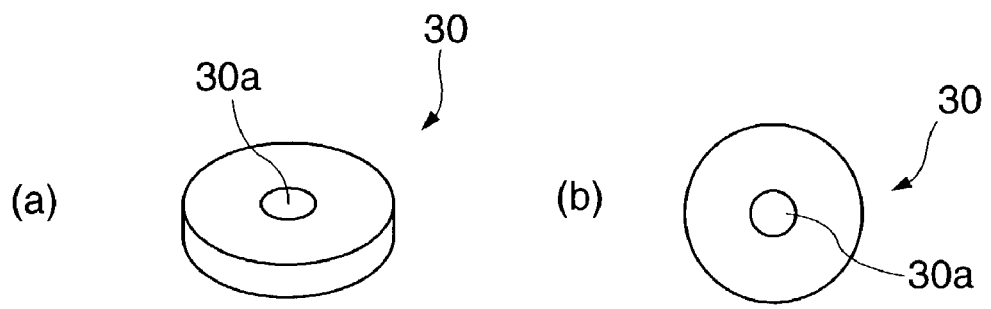
FIGS. 11(a) and 11(b) are schematics that illustrate another center mirror suitable for use in the illumination device shown in FIG. 5, where

According to the fixing method shown in FIG. 8, by attaching the lamp tube 13 to a Z-stage 92 so as to be perpendicular thereto, and by fixing the center mirror 30 in the vertical direction, the surface of the center mirror 30 is aligned so as to be perpendicular to the optical axis 80. More particularly, the lamp tube 13 is fixed to the Z-stage 92 such that the cathode sealing tube 101 and an anode sealing tube 103 of the lamp tube 13 are aligned along the vertical direction while the anode sealing tube 103 lies below the cathode sealing tube 101. Then, a movable guide of the Z-stage is moved down so that the center mirror 30, which has been fixed so that the reflective surface 31 is horizontal above the top 102 of the sealing tube 101, is adjusted so as to lie horizontally above the previously applied adhesive 98 and is bonded to the top 102 of the sealing tube 101 after the fixing of the center mirror 30 has been cancelled. According to this fixing method, even when the top 102 of the lamp tube 13 does not have a flat surface, the reflective surface 31 can be accurately aligned so as to be perpendicular to the optical axis 80.

In addition, since the temperature of the top of the arc lamp usually reaches a temperature of 400° C., the center mirror 30 disposed thereat is required to have adequate high-temperature resistance. To satisfy this requirement, the center mirror 30 must be formed as a reflective structure, or as a mirror having a reflective film, having high-thermal resistance formed thereon. The reflective film of the reflective surface 31 is formed by deposition, sputtering, plating, or the like. Also, the reflective film includes a multi-layer film, such as a dichroic film, Al, Ag, Pt, Au, Ti, Ta, Ni, or an alloy includes at least any two of these metals. In particular, the multi-layer film including a high-thermal resistance material, such as tantalum pentoxide or silicon dioxide, is densely formed, for example, by ion-plating with a built-in-type plasma gun apparatus made by Japan Electron Optics Laboratory Co., Ltd. or the like. So long as the center mirror 30 is formed of a reflective material having such durable (high-thermal-resistance) properties, even when the center mirror 30 is fixed to the top 102 of the lamp 13, a highly reliable illumination device can be obtained.

FIGS. 9(a) to 11(b) illustrate some examples of the center mirror 30 fixed to the top 102 of the lamp 13. As described above, it is desirable that the center mirror 30 have a shape formed in advance so as to allow the electrode wire 13d of the lamp 13 to pass therethrough.

The center mirror 30 shown in FIGS. 9(a) and 9(b) has a U-shaped cut 30s reaching the center thereof. The center mirror 30 shown in FIGS. 10(a) and 10(b) has a hole 30a, formed at its center, having a diameter of about 1 mm. This center mirror 30 is divided into two parts along an abutting section 30k, then these parts sandwich the electrode wire 13d extending from the lamp tube 13, thereby simplifying the fixing operation. The center mirror 30 shown in FIGS. 11(a) and 11(b) has the through-hole 30a at its center so as to provide the largest area of the reflective surface 31.

Figure 12:
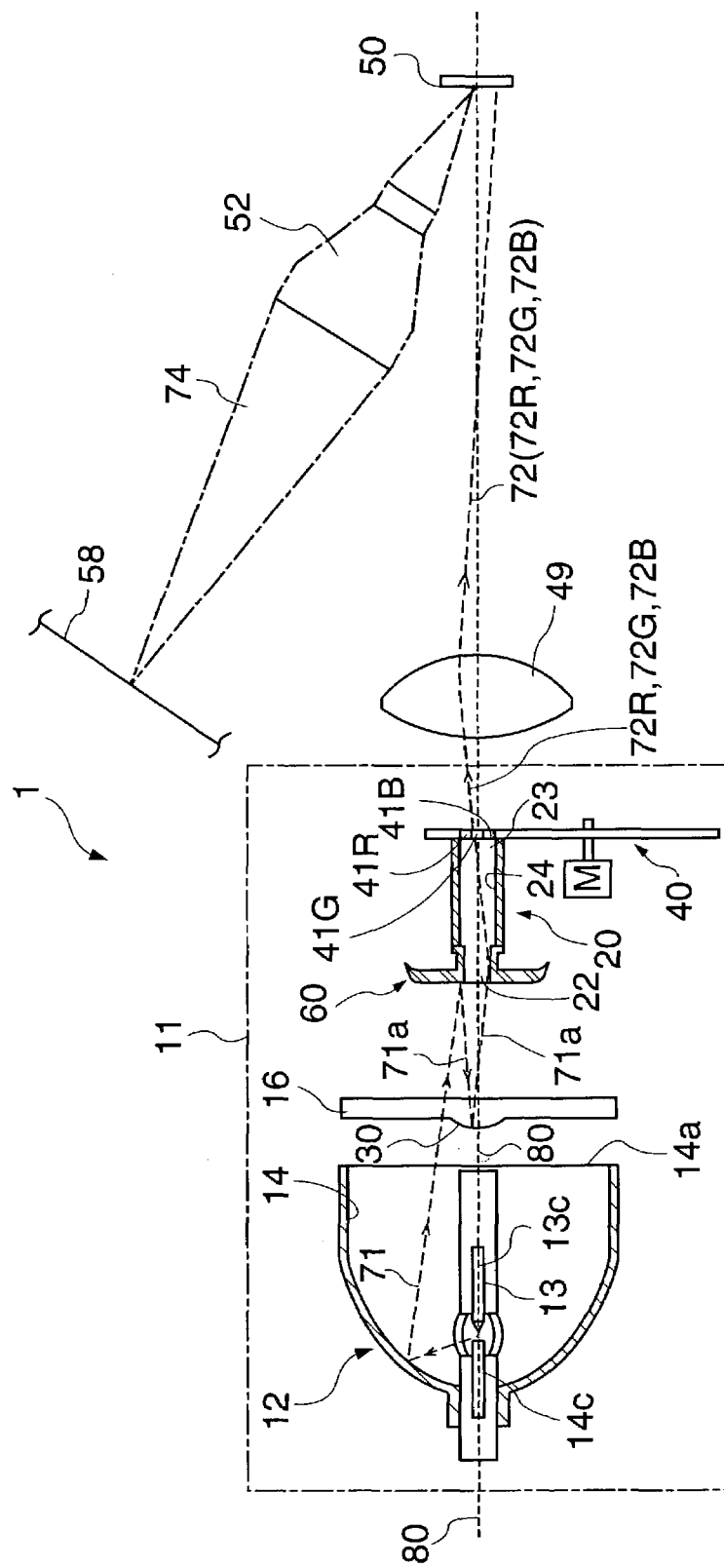
FIG. 12 is a schematic view of a projector using an illumination device, having an integrator including an outer mirror, according to the present invention.

FIG. 12 illustrates the projector 1 having another illumination device 11 according to the present invention. The projector 1 shown in FIG. 12 is basically the same as the projector 1 shown in FIG. 1 except that the illumination device 10 is replaced by the illumination device 11.

Figure 13:
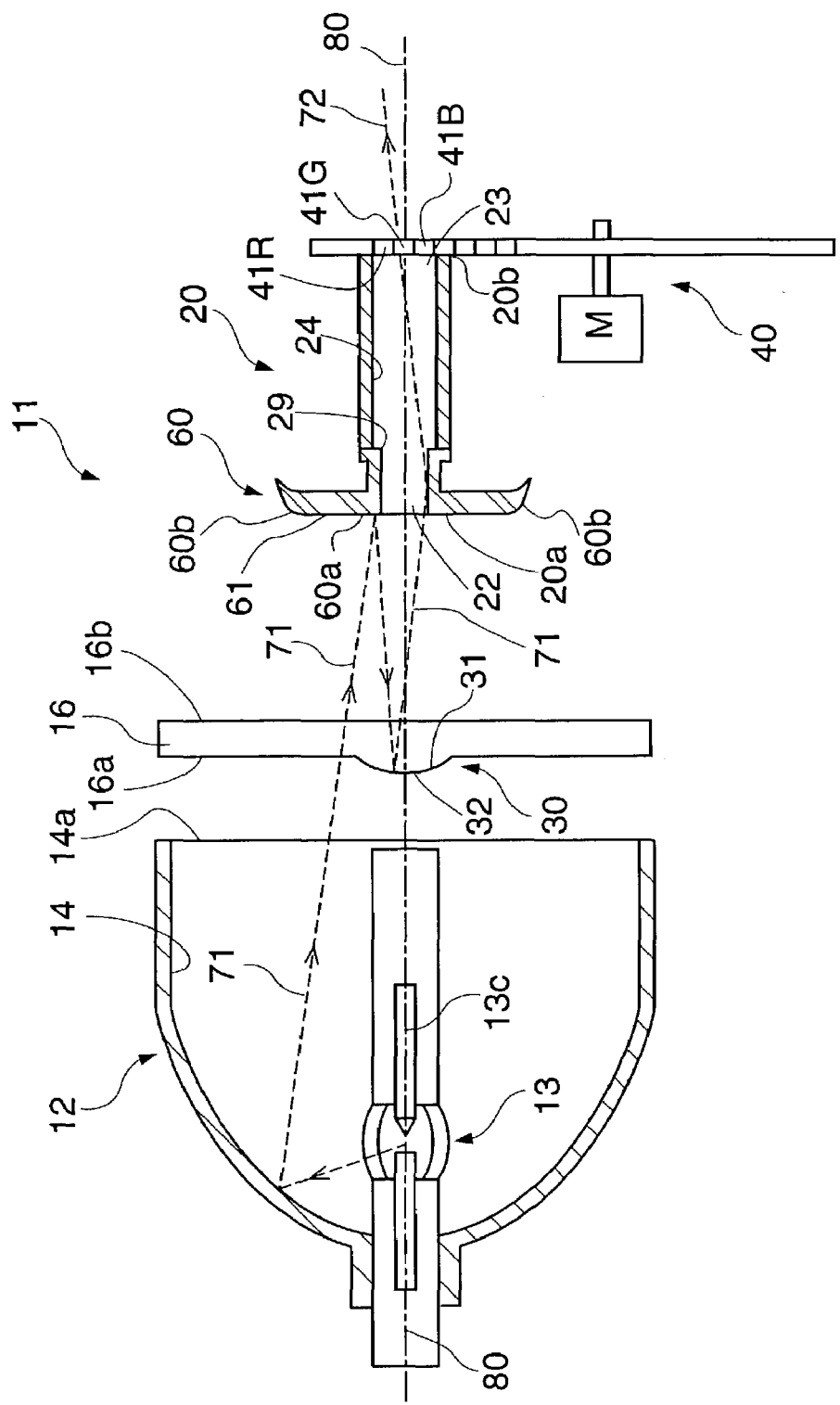
FIG. 13 is an enlarged sectional view of the illumination device shown in FIG. 12.

Also, FIG. 13 is an enlarged schematic of the illumination device 11. The illumination device 11 in this example has an outer mirror 60 extending outwards like a handguard from the outer periphery of the aperture 22 at the incident side 20a of the integrator 20 so as to reflect light towards the light source 12. The outer mirror 60 in this example has a side 61 facing the light source 12 so as to serve as a mirror formed of a flat mirror surface 60a at its central part and a convex mirror 60b, protruding towards the light source 12, at its peripheral part. With this structure, the outer mirror 60 reflects a part of the incident light 71 emitted from the light source 12, which is not incident on the integrator 20 via the aperture 22, so as to return it towards the light source 12. The light returned to the light source 12 by the outer mirror 60 is reflected again towards the integrator 20 by the reflector 14 or the center mirror 30, and is likely to be supplied into the integrator 20 via the aperture 22 of the integrator 20, where the light which has not been introduced into the integrator 20 and accordingly has been wasted until now can be used. As a result, the illumination device 11 further enhances the light utilization efficiency.

The integrator 20 of the illumination device 11 in this example is formed so as to have a two-stage shape in which the end surface 29 to reflect the light returned from the color wheel 40 is formed so as to approach toward the emitting side 20b from the incident side 20a. By forming the integrator so as to have a multistage structure having at least two stages as described above, the number of reflections of the light which is counted from the reflection at the color wheel 40 to the return to the emitting side can be reduced, where the light loss caused by absorption of the inner surface 24 and the like can be reduced. As a result, in this respect, the illumination device 11 in this example enhances the light utilization efficiency.

Figure 14:
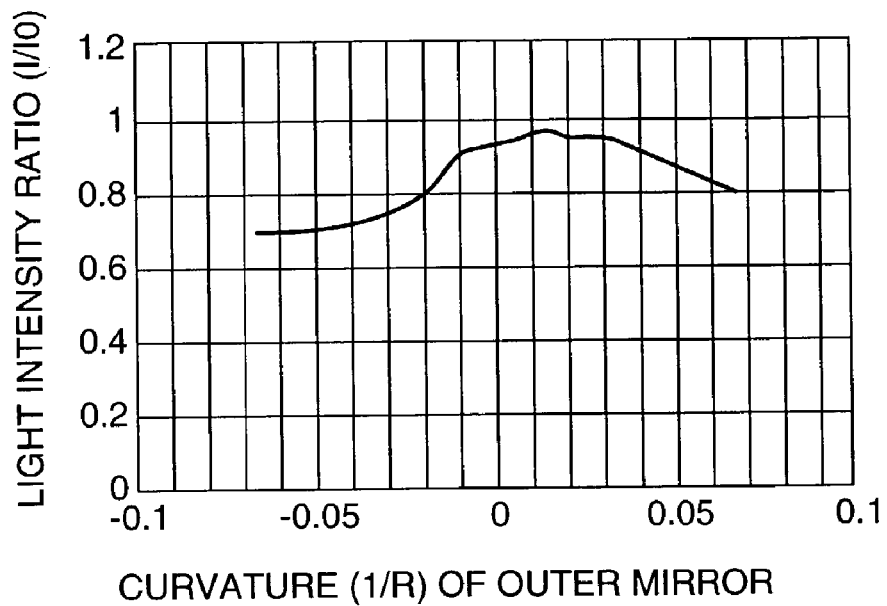
FIG. 14 is a graph illustrating the relationship between the changes in the light intensity and the curvature of the outer mirror.
Figure 15:
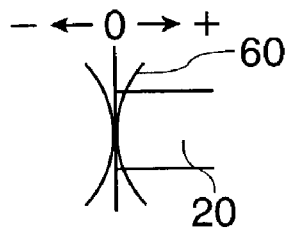
FIG. 15 is a schematic that illustrates the relationship between the curvature and the concave or convex shape of the outer mirror having a characteristic shown in FIG. 14.

Regarding the illumination device 11 in this example, FIG. 14 illustrates the relationship between the curvature of the outer mirror 60 and the light intensity I of the incident light 71 incident on the integrator 20 from the light source 12, where the light intensity I of the incident light 71 is shown by the ratio (light intensity ratio (I/I0)) of the light intensity I of the incident light to the output intensity I0 of the lamp 13. As shown in FIG. 15, when the curvature 1/R has a minus figure, the outer mirror 60 is a concave mirror protruding towards the emitting side of the integrator 20, and when the curvature 1/R has a plus figure, the outer mirror 60 is a convex mirror protruding towards the lamp 13.

As is shown from FIG. 14, since, when the curvature 1/R is in the range from −0.05 to +0.05, the light intensity ratio is greater than that shown in FIG. 3, it is proved that the outer mirror 60 further enhances the light utilization efficiency. Moreover, since the light reflected at the region of the outer mirror 60 which includes its flat mirror and the vicinity of the flat mirror having a small curvature 1/R, i.e., a large radius R of curvature, is converged in the vicinity of the center mirror 30, the center mirror 30 effectively guides the converged light to the aperture 22 at the incident side of the integrator 20. Thus, it is seen that the light intensity ratio increases and the light utilization efficiency is further enhanced. Furthermore, when the outer mirror 60 is a convex mirror and its curvature 1/R is about 0.015, the light intensity ratio exceeds about 0.9, where it is proved that almost all the illumination light output from the lamp 13 can be input into the integrator 20 without a significant loss.

Although FIG. 13 illustrates the outer mirror having a curved mirror surface by way of example, instead of the convex mirror, the outer mirror may have a truncated cone mirror surface (in this case, the outer surface of the truncated cone shape serves as the outer mirror) protruding towards the light source 12. Also, instead of the concave mirror, the outer mirror may have a truncated cone mirror surface (in this case, the inner surface of the truncated cone shape serves as the outer mirror) protruding towards the emitting side 20b of the integrator 20, and this outer mirror exhibits substantially the same characteristic as that shown in FIG. 12.

Figure 16:
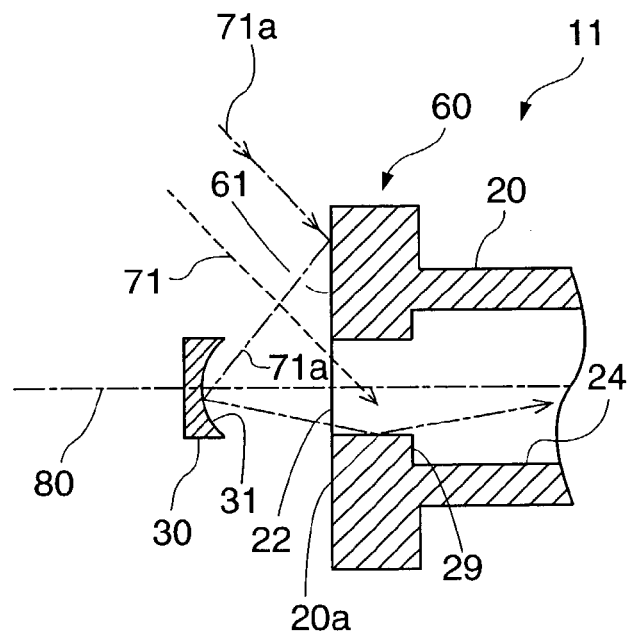
FIG. 16 is a schematic that illustrates an example combination of the center mirror and the outer mirror.
Figure 17:
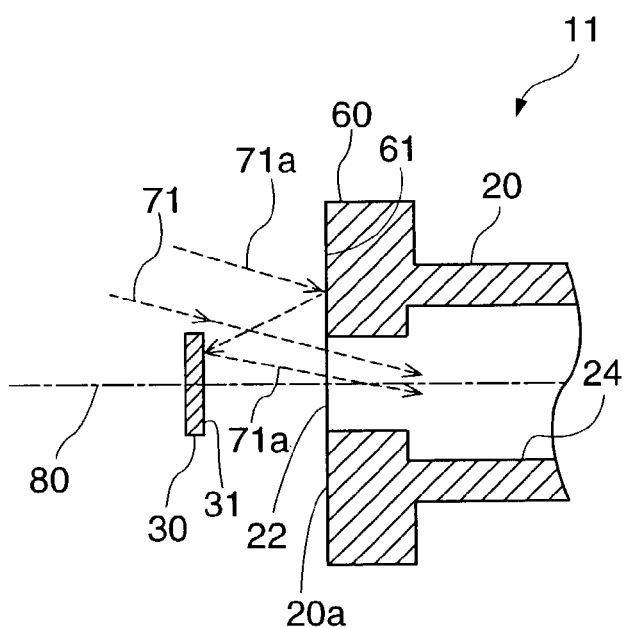
FIG. 17 is a schematic that illustrates another example combination of the center mirror and the outer mirror.
Figure 18:
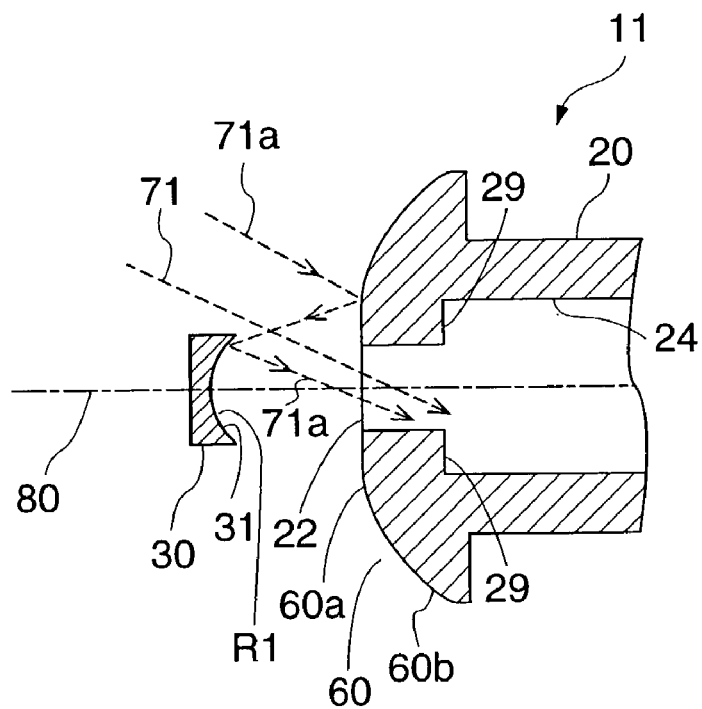
FIG. 18 is a schematic that illustrates another example combination of the center mirror and the outer mirror.

FIGS. 16 to 18 illustrate several combinations of the center mirrors 30 and the outer mirrors 60 according to the present invention. In the combination shown in FIG. 16, the center mirror 30 is a concave mirror with respect to the integrator 20 and the outer mirror 60 is a flat mirror. Thus, the outer mirror 60 reflects light 71a, which does not enter the aperture 22 at the incident side 20a of the integrator 20, towards the center mirror 30 so as to be introduced into the aperture 22 via the center mirror 30. This combination can be realized at relatively low cost since the outer mirror 60 is a flat mirror.

In the combination shown in FIG. 17, the center mirror 30 and the outer mirror 60 are both flat mirrors. With this combination, the outer mirror 60 also reflects the light 71a, which does not enter the aperture 22 at the incident side 20a of the integrator 20, towards the center mirror 30 so as to be introduced into the aperture 22 via the center mirror 30. Although this combination has a low capability of condensing light at the aperture 22 since the center mirror 30 is a flat mirror and is thus likely to have a slightly reduced efficiency of collecting light, this combination can be realized at a reduced or minimum cost since this configuration includes only flat mirrors.

In the combination shown in FIG. 18, the center mirror 30 having a concave mirror surface with respect to the integrator 20 and the outer mirror 60 having the flat mirror surface 60a at its central part and the convex mirror 60b which protrudes toward the light source 13 at its periphery part are combined. As shown in FIG. 18, when the outer mirror 60 is a convex mirror, since the incident light 71a is effectively guided towards the center mirror 30, the highest light utilization efficiency can be achieved. In addition, since the outer mirror 60 has the flat mirror 60a at its central part in this example, the light which is reflected at the center mirror 30 but which is not input into the integrator 20 is likely to be reflected again at the outer mirror 60 towards the center mirror 30 and to be likely guided to the aperture 22 by the concave center mirror 30. Accordingly, it can be said that this combination offers the highest light utilization efficiency. In this combination, in order for the concave center mirror 30 to effectively converge the light at the aperture 22, which is reflected at the convex outer mirror 60, the curvature (1/R1) of the center mirror 30 is preferably greater than the curvature (1/R2) of the outer mirror 60. Therefore, the radius R1 of curvature of the center mirror 30 is preferably smaller than the radius R2 of curvature of the outer mirror 60. Also, when the focal point of the concave mirror of the center mirror 30 is set in the vicinity of the aperture 22 at the incident side of the integrator 20, the light reflected from the outer mirror 60 can be more effectively introduced into the aperture 22 of the integrator 20.

As described above, when the illumination devices 10, 10a, and 11 according to the present invention are of a color-recapture-type, the light which is likely to leak out from the aperture at the incident side of the integrator 20 can be collected by the center mirror. Also, when the outer mirror is disposed so as to collect the light which is emitted from the light source but which is not incident on aperture of the integrator 20, the light is more effectively input into the integrator 20 by making use of the advantage of the center mirror. According to the simulation results performed by the inventors of this invention, 90% or more of the illumination light output from the lamp of the light source can be input into the integrator 20 when certain conditions are satisfied.

As a result, since the light utilization efficiencies of the illumination devices 10, 10a, and 11 according to the present invention are high, a compact, high-power illumination device can be provided. Also, by incorporating one of the illumination devices 10, 10a and 11 in these examples into the projector 1 shown in FIG. 1 or 12, a projector which displays a clear image can be provided.

Figure 19:
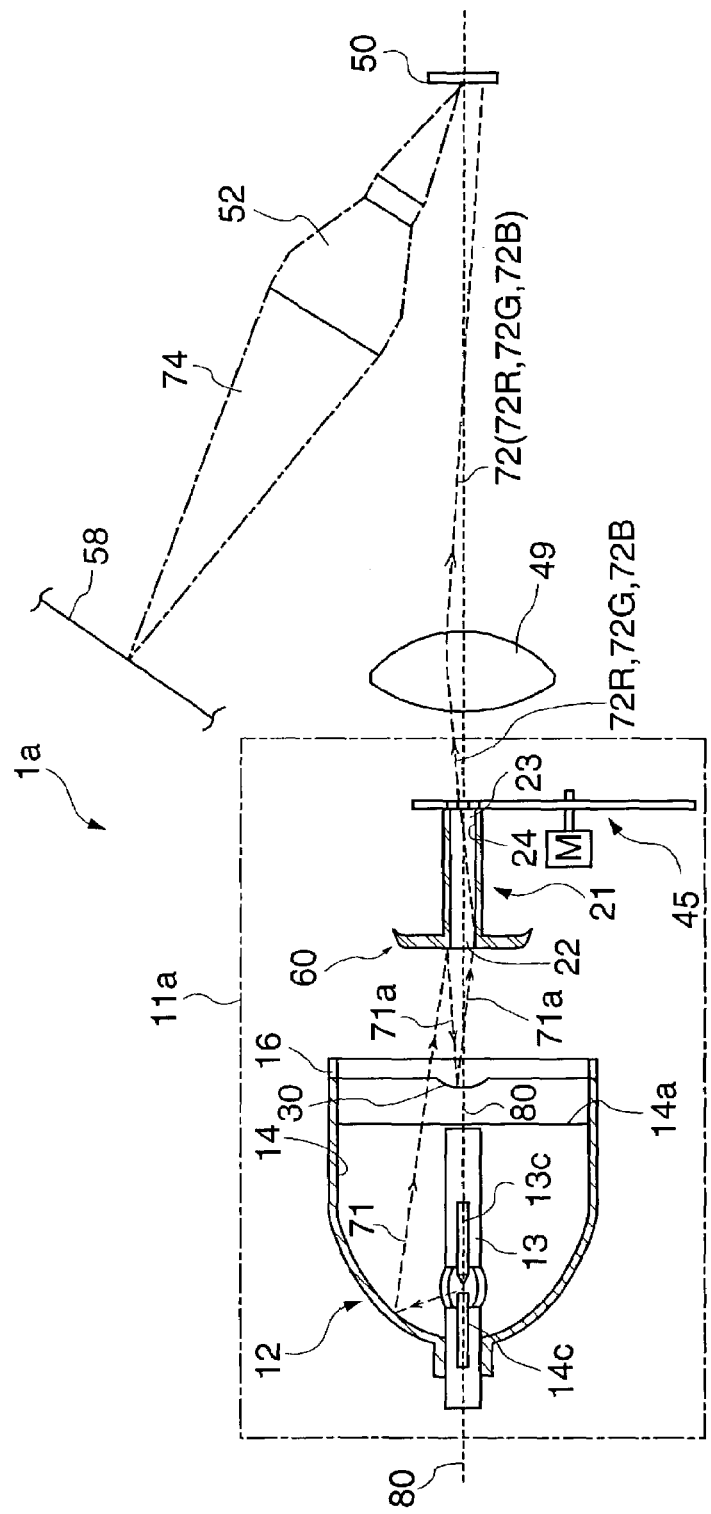
FIG. 19 is a schematic that illustrates a projector using another illumination device, having a center mirror and an outer mirror, according to the present invention.

FIG. 19 illustrates a projector 1a having another illumination device 11a according to the present invention. The illumination device 11a in this example is not of a color-recapture-type, and instead it separates a white luminous flux into luminous flux of the respective colors in a time-division manner with a color filter 45 and emits them to the light valve 50 so as to display a color image.

The projector 1a shown in FIG. 19 is basically the same as the projector 1 shown in FIG. 12 except that the illumination device 11 is replaced by the illumination device 11a. Also, the illumination device 11a shown in FIG. 19 is basically the same as the illumination device 11 shown in FIG. 12 except that the integrator 20 is replaced by an integrator 21. The integrator 21 has a structure in which the end surface (reflective end surface) 29 is removed from the integrator 20 (FIG. 12). Accordingly, little of the light is recycled in the integrator 21. However, by disposing the center mirror 30 to reflect light from the integrator 21 and also by disposing the handguard-shaped outer mirror 60 at the incident side of the integrator 21, the light which is not input into the integrator 21 is recycled between the integrator 21 and the light source 12, whereby the light utilization efficiency can be enhanced.

Figure 20:
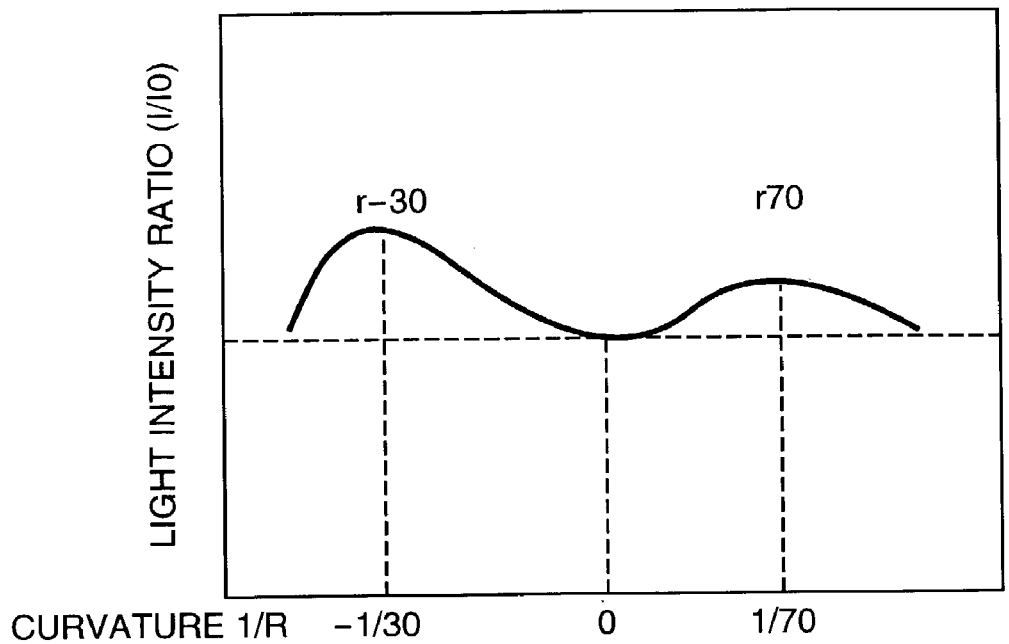
FIG. 20 is a graph illustrating the relationship between the changes in the light intensity and the curvature of the center mirror of the illumination device shown in FIG. 19.

FIG. 20 illustrates the relationship between the curvature (the reciprocal of the radius of curvature) of the center mirror 30 and the light intensity I of the light output from the integrator 21, which is emitted from the light source 12 and is then incident on the integrator 21, wherein the light intensity I is shown by the ratio (light intensity ratio (I/I0)) of the light intensity I to the intensity I0 obtained when the center mirror 30 has a flat surface (the curvature=0). When the curvature 1/R has a minus figure as shown in FIG. 20, the center mirror 30 is a convex mirror protruding towards the integrator 21. When the curvature 1/R has a plus figure, the center mirror 30 is convex and protruding towards the lamp 13, that is, the center mirror is a concave mirror. As two peak values appear when the radii R of curvature of the center mirror 30 are −30 and +70, it can be shown that the light intensity of illumination light output from the integrator 21 depends on the curvature of the center mirror 30. Therefore, to dispose the center mirror 30 even in the illumination device 11a which is not of a color-recapture-type is effective to enhance the light utilization efficiency.

Although the illumination device includes a hollow-rod integrator in the foregoing description, it may include a solid-rod integrator of a glass lens type.

Also, the light valve of the projector is not limited to the mirror device 50 which drives a micro-mirror. An evanescent device serving as an image display device which performs switching by utilizing evanescent light or evanescent wave with a move of the order of its wavelength may be used as a reflective device. One of the examples of the mirror device 50 is a DMD (digital micro mirror device) available from Texas Instruments Inc. Since these reflective light valves can be driven at high speed and have a high contrast, they are suitable for use in projectors to display a clear image. Also, a highly reliable LCD or the like may be used as a transmission type light valve. The illumination device according to the present invention is applicable not only to a projector, but also to a direct-view display device which requires light separated into necessary colors, a printer, and so forth, for example.

As described above, by positioning a center mirror between the light source and the incident side of an integrator, which is suitable for use in a color-recapture-type illumination device, the illumination device according to the present invention can enhance its light utilization efficiency. Accordingly, with the illumination device according to the present invention, a projector which displays a brighter and clearer color image can be provided.

What is claimed is:

1. An illumination device, comprising:
    an integrator having an incident side and an emitting side, the integrator transmitting light from the incident side to the emitting side;
    a light source that supplies the light to the incident side of the integrator, the light source including a reflector and a lamp located on a center axis of the reflector; and
    a center mirror located on a line connecting a center of the incident side of the integrator and the lamp, the center mirror reflecting light from the integrator back to the integrator, the center mirror having a smaller diameter than a diameter of an opening of the reflector.

2. The illumination device according to claim 1, further comprising a color filter located at the emitting side of the integrator,
    the color filter including a plurality of portions, each of the plurality of the portions transmitting light in respective wavelength ranges and reflecting the light out of the respective wavelength ranges, the respective wavelength ranges of the portions being different from each other, and the at least two portions having the different wavelength ranges from each other correspond to an aperture at the emitting side of the integrator at a time.

3. The illumination device according to claim 1, the integrator having a reflective inner surface.

4. The illumination device according to claim 1, the integrator having multistage structure.

5. The illumination device according to claim 1, further comprising an explosion-proof glass plate covering the opening of the reflector, the explosion-proof glass plate having the center mirror.

6. The illumination device according to claim 1, the center mirror having a flat mirror surface.

7. The illumination device according to claim 1, the center mirror being a concave mirror.

8. The illumination device according to claim 7, the center mirror having a focal point in the vicinity of an aperture at the incident side of the integrator.

9. The illumination device according to claim 1, the center mirror having an outer diameter in a range of 5% to 25% of a diameter of the opening of the reflector.

10. The illumination device according to claim 1, the center mirror having an outer diameter in a range of 10% to 20% of a diameter of the opening of the reflector.

11. The illumination device according to claim 1, the center mirror having an outer diameter of about 15% of a diameter of the opening of the reflector.

12. The illumination device according to claim 1, further comprising an outer mirror located around an aperture at the incident side of the integrator, the outer mirror being capable of reflecting the light towards the light source.

13. The illumination device according to claim 12, the outer mirror having a flat mirror surface.

14. The illumination device according to claim 12, the outer mirror having a truncated cone shape protruding towards the light source.

15. The illumination device according to claim 12, the outer mirror being a convex mirror.

16. The illumination device according to claim 12, the outer mirror having a central part and a peripheral part, the central part having a flat mirror surface, and the peripheral part having a convex surface or a truncated cone shape protruding towards the light source.

17. The illumination device according to claim 12, the outer mirror having a truncated cone shape protruding towards the emitting side.

18. The illumination device according to claim 12, the outer mirror being a concave mirror.

19. The illumination device according to claim 12, the outer mirror having a central part and a peripheral part, the central part having a flat mirror surface, and the peripheral part having a concave surface or a truncated cone shape protruding towards the emitting side.

20. The illumination device according to claim 12, the center mirror being a concave mirror, and the outer mirror being a convex mirror having a larger radius of curvature than that of the center mirror.

21. A projector, comprising:
    the illumination device according to claim 1;
    a light valve that modulates light of respective colors output from the illumination device; and
    a lens system that projects light modulated by the light valve.

* * * * *